United States Patent
Connell, II et al.

(10) Patent No.: US 11,689,916 B2
(45) Date of Patent: Jun. 27, 2023

(54) PRIVACY ENHANCED LOCATION VERIFICATION FOR IMPROVED TRANSACTION SECURITY

(71) Applicant: International Business Machines Corporation, Armonk, NY (US)

(72) Inventors: Jonathan H. Connell, II, Cortlandt-Manor, NY (US); Jae-Eun Park, Wappingers Falls, NY (US); Nalini K. Ratha, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 16/356,462

(22) Filed: Mar. 18, 2019

(65) Prior Publication Data
US 2020/0304993 A1    Sep. 24, 2020

(51) Int. Cl.
*H04W 12/02* (2009.01)
*H04W 8/22* (2009.01)
*H04W 64/00* (2009.01)

(52) U.S. Cl.
CPC ............ *H04W 12/02* (2013.01); *H04W 8/22* (2013.01); *H04W 64/003* (2013.01)

(58) Field of Classification Search
CPC ...... H04W 8/22; H04W 12/02; H04W 64/003
USPC ...................................................... 455/411
See application file for complete search history.

(56) References Cited

U.S. PATENT DOCUMENTS

| | | |
|---|---|---|
| 6,952,181 B2 | 10/2005 | Karr et al. |
| 8,045,995 B2 | 10/2011 | King et al. |
| 9,521,510 B2 | 12/2016 | Prehn et al. |
| 9,875,478 B1 | 1/2018 | Tyler |
| 2013/0298248 A1 | 11/2013 | Boldrev et al. |
| 2013/0325738 A1 | 12/2013 | Swanson et al. |
| 2018/0096350 A1 | 4/2018 | Groarke et al. |

OTHER PUBLICATIONS

Random House Webster's College Dictionary, 884 (2nd Random House ed. 1999).*

* cited by examiner

*Primary Examiner* — Joel Ajayi
(74) *Attorney, Agent, or Firm* — Stephen J. Walder, Jr.; Jeffrey S. LaBaw

(57) ABSTRACT

Mechanisms are provided to implement a privacy enhanced location service for determining a granularity of location information to return to a requestor computing device. The privacy enhanced location service receives, from a requestor computing device, a location query requesting location information for a subject. The privacy enhanced location service retrieves a selected subject privacy policy data structure, selected from a set of subject privacy policy data structures corresponding to the subject identified in the location query. The privacy enhanced location service applies the selected subject privacy policy data structure to location information associated with the subject to generate modified location information having a granularity of location information specified in the selected subject privacy policy data structure. The privacy enhanced location service transmits the modified location information to the requestor computing device.

20 Claims, 5 Drawing Sheets

PRIVACY ENHANCED LOCATION VERIFICATION FOR IMPROVED TRANSACTION SECURITY

BACKGROUND

The present application relates generally to an improved data processing apparatus and method and more specifically to mechanisms for providing privacy enhanced location verification for improved transaction security.

In the modern environment of ever increasing amounts of interconnectivity through data networks and the various services provided via these data networks, privacy of information is of increasing importance. Many services collect information without the knowledge of the subjects of the information collection, and exchange that information with other service providers and third parties, again without the direct knowledge of the subjects. The subjects themselves may have generally agreed to information collection through usage agreements where the subject, in order to gain access to a service, must agree to the data collection. Moreover, some of these agreements include clauses that permit exchange of collected data with other third parties.

Subjects may agree to such arrangements without fully understanding the extent to which this data collection and exchange may be performed, leading to issues of privacy. Moreover, under the laws of the applicable jurisdictions, some data collection may be performed without the expressed agreement of the subjects themselves, especially in cases of governmental data collection, law enforcement data collection, and the like.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, the at least one memory comprising instructions executed by the at least one processor to configure the at least one processor to implement a privacy enhanced location service. The method comprises receiving, by the privacy enhanced location service, from a requestor computing device, a location query requesting location information for a subject. The method further comprises retrieving, by the privacy enhanced location service, a selected subject privacy policy data structure, selected from a set of subject privacy policy data structures corresponding to the subject identified in the location query. In addition, the method comprises applying, by the privacy enhanced location service, the selected subject privacy policy data structure to location information associated with the subject to generate modified location information having a granularity of location information specified in the selected subject privacy policy data structure. Furthermore, the method comprises transmitting, by the privacy enhanced location service, the modified location information to the requestor computing device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
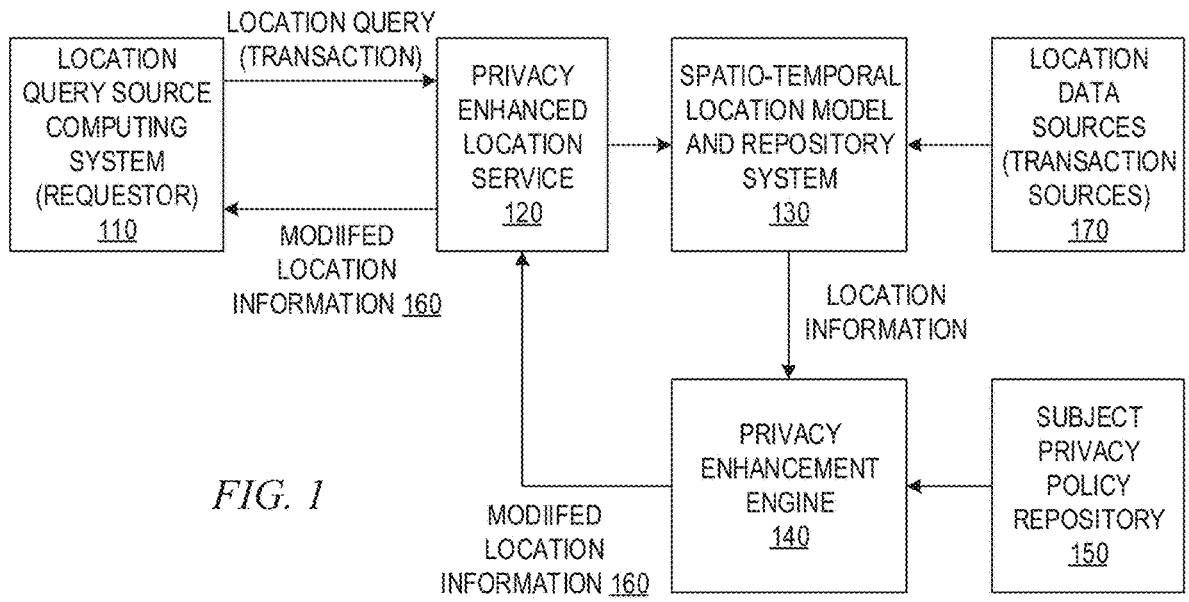
FIG. 1 illustrates a functional block diagram and information flow of an example privacy enhanced location service computing system in accordance with one illustrative embodiment.

As mentioned above, the modern interconnected and service oriented world leads to an increased demand for solutions to protect private information about users. For example, in order to prevent transactional fraud, service providers use the location of the user (customer) as an important element in verifying the transaction. For this verification to be effective, a robust, accurate, and detailed spatio-temporal model is needed to identify the specific location of the user at the specific time of the transaction. However, having such a spatio-temporal model can be a liability to service providers as it can expose significant personal information to parties unrelated to the transaction. For example, a detailed spatio-temporal model may, for a particular user, indicate that the user visits a particular location on a regular basis, which if exposed to other parties may be problematic to the patient's reputation or cause personal issues for the user that may expose service providers to potential liability. For example, if the spatio-temporal model shows that the user visits a fast food restaurant on a routine basis, they may not want this information exposed to their health provider or health insurance provider.

Moreover, in some cases, having a spatio-temporal model may result in exposing more personal information than is necessary to verify a transaction, even to parties of the transaction. Furthermore, in some cases, personal information may be exposed to law enforcement agencies in violation of user's privacy rights and/or in violation of a user's right to due process and rights against self-incrimination. Thus, there is a need to provide an improved computer tool to assist users in controlling the dissemination of their location information gathered by such spatio-temporal models and the granularity or level of detail of the location information disseminated, which in turn shifts the control, and at least some of the responsibility, of maintaining the privacy of the user's location information to the user himself/herself.

The illustrative embodiments provide mechanisms for controlling the granularity of location information about a user (also referred to herein as a subject since they are the "subject" of the location information request) as part of a transaction, based on the subject's established policy. The subject's established policy specifies what granularity of location information the subject agrees to disclose to different types of parties to the transaction, in accordance different types of transactions, and the like. The mechanisms of the illustrative embodiments determine what type of party is requesting location information, what type of transaction is associated with the request for the location information, and the like, and determines a granularity of location information that the subject has agreed to provided to such a requestor under the transaction circumstances. Based on the determined granularity of location information, the actual location information of the subject at the time of the transaction is modified, e.g., downgraded, to a level of granularity commensurate with the determined granularity of location information permitted by the policy. By "downgraded", what is meant is that the granularity of the location information is made less specific or precise with the level of precision being specified by the granularity of location information indicated in the policy. This modified level of location information is then returned to the requestor.

Negotiation limits may also be provided in the subject's policy, allowing for automated or manual negotiation of the established policy settings for a particular party/transaction based on characteristics of the transaction. For example, while the policy may state that for a credit card transaction, the party requesting location information about the subject, i.e. the requestor, may receive only location information specifying the current state or territory that the subject is in, if the transaction involves a purchase higher than a specific dollar amount, the requestor may wish to know in which particular city in the state/territory the subject is located at the time of the transaction. In such a case, negotiation limits specified in the policy may indicate that if the requestor requests finer grain location information, and that the amount of the transaction is higher than a specified amount, then the level of location information may be temporarily increased for that transaction to include up to city-level information. Alternatively, the negotiation limit may specify that a notification must be sent to the subject, via a registered communication device, at which point the subject is given the option to agree to, or not agree to, the increased level of location information to complete the transaction.

For example, consider an example of a credit card transaction where the financial institution, e.g., the bank, is attempting to verify the location of the authorized user of the credit card so as to determine whether or not the user is in the same location where transaction is taking place. As a result, the location query is transmitted and the privacy enhanced location information mechanisms of the illustrative embodiments determine what granularity of location information to return to the requestor computing device. For example, assume that a location query for this example has the following associated features or characteristics:

Location Query:
Questioner: XYZ Bank
Tx Type/Reason: Credit Card Purchase
Amount: $500-$1000
Desired Granularity: Establishment
Accepted: Within 10 Miles (City)
When: 10:37 am today In this example, assume also that the subject, i.e. the authorized user of the credit card in this case, who is identifiable from the credit card number and corresponding account information, has defined a policy restricting the location information that may be returned to requestors. For example, the policy may include, at least in part, the following criteria:

User Location Privacy Policy:
Tx Type/Reason: Credit Card Purchase
Amount: $500 or higher
Negotiation Limit (Allowed): Street Intersection
Preferred: State or Territory As can be seen from this example, the subject or user wishes to only return "State or Territory" level granularity of location information meaning that the user only wishes to return location information indicating the State or Territory in which they are located. However, for credit card purchases in which the amount of the purchase is $500.00 or higher, the user is authorizing negotiation down to the street intersection level of detail in the user's location information.

Through global positioning system (GPS) mechanisms, cellular triangulation location systems, or the like, the precise location of the user may be known to be lat. 40.763652, long. −73.974022 from 10:19-10:42 am on the day of the location request. While XYZ would like to know the precise establishment in which the user was located, the privacy policy restricts the location information only to the State or Territory. However, through an automated or semi-automated negotiation operation, this original coarser grain location information may be negotiated down to a street intersection level of location information, e.g., near E $57^{th}$ and $5^{th}$ Avenue in New York City, that is returned to the requestor, e.g., XYZ Bank, computing system.

Thus, the mechanisms of the illustrative embodiments provide an improved computer tool for controlling the granularity or level of detailed location information about a participant (user/subject) in a transaction based on the participant's established policy for dissemination of the location information and/or negotiation policy. This provides new functionality in the computer tool and improves the operation of location services by providing additional functionality to protect privacy of location information for users/subjects when conducting various types of transactions with various types of requestors. The present invention is specifically directed to this improved computer tool that provides the new functionality that is specifically directed to providing user/subject policy based controls for controlling the dissemination of user/subject location data or information to other parties via one or more data communication networks.

In one illustrative embodiment, mechanisms are provided for collecting transaction details associated with a user/subject (hereafter referred to as a "subject" as they are the subject of the location information request) who is a party of the transaction. Such collection of transaction details may be performed for a plurality of transactions and other activities involving the user over a period of time, the details of which are transmitted to the collecting mechanisms. Transaction analytics are executed on the collected transaction details information to examine each of the incoming data elements to the collector and determine whether those data elements support a current location hypothesis or suggest a new location for the subject. Based on the results of the transaction analytics, a location inference engine updates the subject's presumed location when the evidence from the collected data elements is sufficiently supportive of a new location for the subject.

A location request answering service is provided, implementing a corresponding spatio-temporal location model, infers the subject's previous, current, and/or anticipated spatio-temporal location based on the spatio-temporal location model and past/current transaction analytic results data. The location request answering service responds to requests for location information for a specified subject, such as may be part of a transaction with another service executing on another computing device operating as the requestor, for example. The location request answering service operates in conjunction with a privacy enhancement engine of the illustrative embodiments that provides the logic for determining a granularity or level of detail of location information about the subject to release to the requestor based on established policies specified by the subject, or a default granularity/level of detail of the location information if subject specified policies for the particular requestor/transaction characteristics have not been defined by the subject. The privacy enhancement engine modifies the granularity/level of detail of the location information of the subject in accordance with the corresponding policies so as to downgrade the spatio-temporal precision (i.e. the granularity/level of detail) of the location information in accordance with the policies. Moreover, the location request answering service and privacy enhancement engine may operate to negotiate, automatically or semi-automatically, the spatio-temporal precision of the location information returned to the requestor in accordance with negotiation limits associated with the subject's defined policies.

Having summarized elements of various illustrative embodiments above, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a functional block diagram and information flow of an example privacy enhanced location service computing system in accordance with one illustrative embodiment. As shown in FIG. 1, a location query source, or requestor, computing system 110 transmits a query, such as may be included as part of a transaction verification communication, or the like, to a location service computing system 120 in which the location services provided are enhanced with mechanisms of one or more illustrative embodiments of the present invention. The privacy enhanced location service computing system 120 implements a spatio-temporal location model and subject location repository system 130 to infer the location of a subject of the location query. The privacy enhanced location service computing system 120 implements a privacy enhancement engine 140 to modify the location information of the subject to an appropriate granularity, or level of detail, of location information according to an established subject privacy policy of the subject of the location query as specified in a subject privacy policies database 150. The privacy enhancement engine 140 generates modified location information 160 that is returned to the location query source computing system 110 in response to the location query.

The location query may be a structured or unstructured query. For example, as a structured query, the location query may be part of a transaction or an associated structured request associated with a transaction and may have fields that specify the subject and characteristics of the source and/or transaction. In the case of an unstructured query, the location query may be presented as a natural language request, question, or the like, directed to obtaining location information for a specified subject. As such, natural language processing may be performed on the unstructured query to extract the features of the unstructured query that used to generate an answer to the query.

Whether structure or unstructured, the location query specifies a subject of the location query and one or more characteristics of the basis for the query, e.g., transaction characteristics. In some illustrative embodiments, the location query may further specify a desired level of detail/granularity of the location information requested as well as a temporal granularity for matching the location information, e.g., in the past, in the present, or even in the future.

For example, the location query may specify the name or identifier of a particular subject, such as a user or other party to a transaction, a credit card or account identifier, or the like, and may specify the transaction type (e.g., credit card transaction, account limit and funds available check, etc.) and/or reason for the location query, such as the need to verify a commercial transaction, a criminal investigation, another user wanting to know the location of the user, or the like. This reason for the location query may be specified in different ways. In one implementation, the reason may be based on the inferred from an identity of the location query source computing system 110, or service implemented by the location query source computing system 110, itself and what entity the computing system 110 is associated with, which may be specified in the location query itself. For example, if the identity of the location query source computing system 110 is that of a credit card transaction verification system, then the reason for the location query is to verify the location of the subject for purposes of verifying a credit card transaction. As another example, if the identity of the location query source computing system 110 is that of another user's personal computing device, portable communication device, or the like, the inferred reason for the location query is to identify the location of the subject for personal purposes, e.g., a "Find My Friend" capability. In still a further example, if the identity of the location query source computing system 110 is that of a governmental or law enforcement computing system, then the inferred reasoning is that of governmental regulation or law enforcement. In some illustrative embodiments, the location query may be part of the transaction itself, for which the location query is executed.

The location query may directly request a user's location or, alternatively, propose a location for the system to validate. This is the difference between asking "Where was David last Wednesday?" and asking "Was David in New York last Wednesday?" Answering yes/no questions is generally sufficient for determining the validity of a financial transaction, and divulges a minimal amount of sensitive personal information. That is, if a purchase was purportedly made in New York City and the system answers "no" to the query "Was David in New York last Wednesday?", the credit card company can flag the transaction as fraudulent. However the credit card company has no idea whether the purchaser was actually in Chicago, Miami, rural Pennsylvania, or somewhere else instead.

The location query may specify a temporal specification of varying granularity, either past, present, or future. That is, for example, the location query may request location information for a subject at a time in the past, e.g., when there was an occurrence of a previous transaction, a previous event, or the like. For example, the request may be for the purpose of contesting a parking ticket that was issued in the past, e.g., the location query may be of the type "Was David in New York city last Wednesday?" As another example, the request may be for the purpose of arranging a future meeting, e.g., "Will David be at home this evening?". Similarly, the request may be for a current time, such as to verify a commercial transaction, e.g., "Is David at Steve's Electronics in Richardson, Tex.?"

It should be appreciated that the location query may also not be limited to a single location, but may be associated with a group of locations. For example, the location query may specify a general classification of locations in which a plurality of individual locations are classified, e.g., "Is David at an IBM location?" where "IBM location" comprises a plurality of potential individual locations, "Is David at one of his usual locations?" where "usual locations" may comprise locations the subject (David) has previously been to routinely over a period of time, e.g., home, office, health club, etc.

The location query, itself or as part of a transaction, is sent to the privacy enhanced location service computing system 120 from the location query source computing system 110. The location query may take many different forms depending on the basis for the location query, and may originate from a variety of different location query source computing system 110. For example, in some instances, the location query source computing system 110 may be a server computing device implementing logic and computing resources for providing a commercial transaction verification system, such as may be part of a credit card based transaction verification system, bank account transaction verification system, or other financial transaction system. The location query source computing system 110 may include other server based computing devices implementing various systems of logic and computing resources for providing other types of systems that may require location information for various subjects to perform their operations, such as governmental services, law enforcement services, user personal services, such as personal location services, e.g., "Find my Friend" services, etc.

In some illustrative embodiments, the location query source computing system 110 may be a client computing device, such as a point of sale device, a portable communication or computing device associated with another user, or other client computing device. As such, the location query may be associated with various types of transactions which may include financial transactions, personal information transactions, and the like. For example, the point of sale (POS) device may send a request for location information for a subject, e.g., party associated with a credit card or account attempting to be used at the POS device, to the privacy enhanced location service computing system 120 to verify the location of the party associated with the credit card or account as being at the POS device in order to verify the credit card transaction. As another example, a user of a personal communication device may initiate an operation via a software service to find the location of another party, e.g., another user such as a friend, family member, or the like. Thus, the location query may be associated with different types of requests or transactions that each request the location of a particular subject for various purposes or reasons.

In response to the privacy enhanced location service computing system 120 receiving a transaction and/or location query specifying a request for location information for a subject, the privacy enhanced location service computing system 120 obtains the location information for the specified subject from the spatio-temporal location model and repository system 130. The spatio-temporal location model and repository system 130 implements a spatio-temporal model for inferring the location of a subject for a particular time point, which may be the current time, a time of a transaction in the past time, or an anticipated time in the future. The spatio-temporal location model and repository system 130 may also implement a repository of entries for subjects indicating the locations associated with the subject, e.g., locations at previous transaction times, current location, etc. The spatio-temporal location model may operate on location data obtained from a variety of different location data sources 170 to perform its operations to infer the location information for a subject for a time point, or temporal characteristic, associated with the location query.

The location data sources 170 may take many different forms depending on the particular implementation. These location data sources 170 may comprise public sources as well as potentially sensitive location data sources which may assist the spatio-temporal location model and repository system to infer the subjects spatio-temporal location. For example, location data may be obtained from location data sources such as:

(1) office and personal calendar software/data structures (e.g., where the user has been, will be now, or in the future);

(2) children's school calendar data structures (other obligations that may not be on the personal calendar);

(3) airline reservation data obtained from airline reservation computing systems (information about past, present, or future locations);

(4) weather data and predictions from weather service computing systems (information indicating potential travel delays due to inclement weather);

(5) traffic data from traffic data computing systems (information indicating potential delays due to accidents, construction, road closures, etc.);

(6) global positioning system (GPS) location data from GPS location computing systems indicating a last successful GPS location or cellular triangulation location data from a cellular communication system (precise recent past location);

(7) credit card transaction information from credit card transaction computing systems indicating a last successful credit car transaction (imprecise recent location);

(8) last successful automatic teller machine (ATM) transaction and amount information from an ATM computing system (imprecise recent location);

(9) last electronic mail (email) server connection information from an email server computing system (imprecise recent location);

(10) hotel reservation and check-in status information from a hotel computing system (precise recent past/current location);

(11) social media postings information from social media computing systems (past/present/future location information which may be unreliable or vague); and

(12) expected behavior from a statistical user model based on patterns of location information over time, e.g., user is usually at home after 6 PM, user is usually at work between the hours of 9 AM to 5 PM, etc.

One or more types of location data may be received from one or more location data source computing systems 170 and may be ingested and processed by the spatio-temporal location model implemented in the spatio-temporal location model and repository system 130. The spatio-temporal location model may be implemented as one or more trained neural networks, cognitive computing systems, or the like, that are trained through a machine learning process, e.g., supervised or unsupervised machine learning process, to evaluate one or more of the various types of location data and infer a location of the subject from the one or more various types of location data. In some illustrative embodiments, weighting values may be associated with the different types of location data based on an evaluation of the influence or reliability of the type of location data on the correct inference of the location of the subject. The weights may be learned through the machine learning process.

Thus, for example, in one illustrative embodiment, the spatio-temporal model may comprise a neural network trained to evaluate location data types (1), (3), (4), and (7)-(11) with different weight values applied to each of these data types learned through a machine learning process. The combination of these weighted location data types provide an output of the spatio-temporal model that identifies an inference of the location of the subject, where the location data provides evidence in support of the location inference. In some illustrative embodiments, the evidence data, i.e. location data, is further used to determine a confidence measure as to how confident the spatio-temporal model is in the result generated. The confidence measure may be indicative of whether there is sufficient confidence that the subject's location has changed from a previous location associated with the subject and only if the confidence measure is greater than a predetermined threshold is the location of the subject updated.

The location of the subject may be stored in an entry in a subject location repository or database which stores a history of the location of the subject over time. In this way, previous and current locations of the subject may be retrieved from the subject location repository rather than having to perform an inference using the spatio-temporal model with each location query.

In some illustrative embodiments, the operation of the spatio-temporal model to infer the location of the subject is performed responsive to the location query. In other illustrative embodiments, the spatio-temporal model may perform location update operations on a periodic basis, or in response to the occurrence of different types of events that are indicative of a new location associated with the subject. For example, when the subject initiates transactions, which may not require location verification of the transaction, nevertheless, the transaction may initiate an operation of the spatio-temporal model to update the inferred location of the subject and determine whether the location of the subject needs to be updated in the subject location repository. In this way, when a location query is received, the most recent location of the subject may be utilized to increase the speed of processing the location query and corresponding transaction. Similarly, the operation of the spatio-temporal model to update the location of a subject may be performed periodically, such as by a periodic querying of location data sources for new location data since a last operation of the spatio-temporal model.

The location information generated by the spatio-temporal location model and repository system 130 is separated into different levels of detail or granularity. For example, at a high level of detail or granularity the location information may be directed to a country or large geographical region. At a lower level of detail or granularity, the location information may specify a state or territory within the country or large geographical region. At a next lower level of detail, the location information may specify a county, a city, or the like.

The specific granularities or levels of detail of location information may be of various levels depending on the desired implementation.

The location information for the subject of the location query is provided to the privacy enhancement engine 140. The privacy enhancement engine 140 retrieves corresponding pre-defined subject privacy policies for the subject of the location query from the subject privacy policies repository 150 and applies the retrieved subject privacy policies to the location query to determine a level of detail or granularity of location information to return to the location query source computing system 110. The application of the subject privacy policies may result in a modified location information 160 being generated in which the location information is modified, such as through a downgrading operation, to reduce the level of detail or granularity of the location information to a level/granularity commensurate with that permitted by the applicable subject privacy policy. The modified location information 160 is returned to the location query source computing system 110 via the privacy enhanced location service 120 for use by the location query source computing system 110 in performing its operations, e.g., transaction verification or the like.

The subject privacy policies in the repository 150 are predefined by the subject to indicate what levels of detail/granularities of location information the subject is comfortable disclosing to various parties to transactions or other third parties in response to particular location queries. The defining of these policies may be performed through a user interface associated with the subject privacy policies repository 150, which may be accessed by subjects via the client computing devices, data networks, and the like, so as to define and modify the privacy policies associated with that subject. Appropriate logon processes, credential verifications, and the like, may be applied to ensure security of the subject's privacy policies and reduce the likelihood that unauthorized parties may modify the subject's policies without their permission.

The privacy policies themselves may specifies the types of parties, characteristics of transactions/location queries, names/types of requestors of location information, and the like, and the corresponding level/granularity of location information detail that is permitted to be shared with the requestor under conditions of the corresponding transaction/location query characteristics. For example, the subject privacy policies may specify different spatial granularities of the location information for different requestors, e.g., the subject's spouse or significant other is informed of the exact location of the subject in response to a location request, the subject's employer is told the subject's location at the state or territory level of granularity, law enforcement is only provided with yes/no answers to specific locations mentioned in the location query, and only at a predetermined level of granularity, e.g., only yes/no to requests directed to whether the subject is/was in a particular state or territory.

Moreover, the reason or purpose for the location query may also be specified and used as a basis for applying appropriate subject privacy policies, as these may be specified in terms of transaction/location query characteristics. In some illustrative embodiments, the reason/purpose may be expressly stated in the location query itself, its metadata, or the like, e.g., the location query is a private party location query for personal purposes (such as spouse may use to find the location of the subject), the location query is for verifying a credit card transaction, the location query is for verifying a location of the subject for purposes of law enforcement, etc. Alternatively, or in addition, the reason/purpose of the query may be deduced from the characteristics of the location query or corresponding transaction, such as based on the type of location query source computing system that sent the location query, e.g., a credit card company is sending a location query to verify a credit card transaction. The subject may specify different levels of detail/granularities of location information for different transaction/location query characteristics, e.g., different reasons and purposes of the location queries and based on the current location query's characteristics, a corresponding subject privacy policy may be applied.

Thus, based on the identity of the party to the transaction or third party requestor that is the source of the location query, the subject of the location query, and characteristics of the location query or corresponding transaction, a closest matching subject privacy policy, e.g., a policy having a highest number of matching elements, is identified from those retrieved from the subject privacy policy repository 150. The identified matching subject privacy policy is then applied to the location information received from the spatiotemporal location model and repository system 130 to thereby maintain or downgrade a level or granularity of the location information that is returned to the location query source computing system 110. For example, the location information may include GPS location, street level location, city level location, state/territory location, and country or large geographic area location information. The applied subject privacy policy may specify that no more than state/territory location information may be returned to the source 110 and thus, the location information's detail is downgraded to only include state/territory and potentially country/large geographic area level location information.

It should be appreciated that in some cases, a default subject privacy policy may be defined in association with the subject in the repository 150. The default subject privacy policy may be utilized if another subject privacy policy having a minimum degree of matching to the elements of the location query is not identified from those retrieved from the repository 150, or if the subject has failed to define specific subject privacy policies and stored them in the repository 150.

In some illustrative embodiments, the subject privacy policies may also be associated with negotiation limits. For example, the policy may specify negotiation limits as exceptions to the policy under specified circumstances such that more detailed or smaller granularity location information may be provided in violation of the subject privacy policy in certain circumstances and with specific requestors. Thus, as one example, a credit card transaction verification system may request GPS location information in order to verify a credit card transaction. The subject's privacy policy may specify that only state/territory level location information is to be provided to credit card company requestors when they are requesting location information for the purposes of verify credit card transactions. However, the subject may specify a negotiation limit that allows for more detailed location information at the GPS location information level only in cases where the transaction amount is in excess of $500.00. If the current location query is associated with a transaction whose amount exceeds $500.00, then the negotiation limit may be applied to allow a temporary increase of the level of detail or granularity of location information of this particular location query, based on the established negotiation limit and the fact that the requestor has specifically requested the lower level of detail or finer granularity of location information.

The negotiation limit may be used as a basis for automated negotiation of an intermediate level of detail or granularity of location information that is acceptable to the requestor and the subject. That is, the requestor may specify in the location query a desired level of detail of location information, the subject privacy policy may specify a general policy of a level of detail that the subject is comfortable disclosing to the requestor, and the negotiation limit may specify an intermediate level of detail that the subject is willing to allow in certain circumstances and the negotiation may negotiate for this level of detail/granularity of location information.

Granularity negotiation may also be used with yes/no type queries. When asked "Was David in Boston last Wednesday at 10:37 am" the mechanisms of the illustrative embodiments may refuse to answer "yes" or "no" and instead answer "pass" in objection to the overly specific query. Alternatively, rather than simply refusing to answer, the mechanisms of the illustrative embodiments may propose acceptable spatial and temporal limits for the query, like "state and hour only". Based on this feedback the external agency can reformulate the query as "Was David in Massachusetts last Wednesday between 10-11 am". As this new query conforms to the local privacy policy, the system is now willing to answer definitively "yes" or "no".

In some illustrative embodiments, the privacy enhanced location service 120 may be configured to provide location information regarding a subject with restrictions so as to assist in maintaining the subject's privacy with regard to their location information. For example, the privacy enhanced location service 120 may be configured to only respond to up to a predetermined number of location queries per unit of time, so as to avoid automated or manual guessing to attempt to find the location of a user, e.g., "was Dave in New York City last Wednesday at all?" followed by "was Dave in Trenton last Wednesday at all?" followed by "was Dave in Boston last Wednesday at all?" etc. in an attempt to narrow down locations. This limit of the number of location queries that will be answered by the privacy enhanced location service 120 may be dynamically modified based on the level of detail/granularity of the location information requested in the location requests. For example, if location queries are requesting very detailed location information about a subject, and more than a predetermined number of such location queries are being received within a particular unit of time, it is indicative of an unauthorized party attempting to access location information about the subject and such queries should be limited or blocked so as to protect the subject's private location information.

As noted above, the location queries may be processed for a variety of different purposes including performing credit card transaction verification, personal purposes of one user attempting to locate another user, verifying location for law enforcement purposes, and the like. The number of uses and operations that may be performed based on the returned location information is voluminous and not all of these can be detailed herein. Other types of uses of this location information may include, but are not limited to, responsibility delegation and automated implementation of operations by other computing systems, other mechanical systems via corresponding electronic control systems, and the like. For example, if the weather at a subject's residence location has been dry over a certain period of time relative to the current time, the subject may typically water their lawn. However, if the user's flight information indicates that their flight has been delayed such that they will not be able to be home to determine whether to water their lawn, the mechanisms of the illustrative embodiments may automatically irrigate the law if needed. The determination of whether to perform the irrigation may first be based on the determination of the future location of the subject at a particular time, which may be subject to the location information privacy protections of one or more illustrative embodiments of the present invention, followed by the comparison of such location information to residence location information for the subject, and further evaluation of weather data obtained from weather data sources to determine if the dry conditions persist and whether irrigation of the lawn is necessary. Similarly, a control system associated with a mechanical mechanism for feeding a pet, e.g., a dog, at a scheduled time of the day may be instructed to automatically initiate feeding of the dog at the scheduled time in response to location information determinations indicating that the subject will not be present to perform the feeding at the scheduled time, again with the location information privacy being controlled by mechanisms of one or more of the illustrative embodiments of the present invention, e.g., an automated dispenser mechanism may be actuated. Many other types of control systems and computing systems may be automatically controlled to perform operations in response to analysis of location information provided in accordance with one or more of the illustrative embodiments, without departing from the spirit and scope of the present invention.

Thus, the mechanisms of the illustrative embodiments provide mechanisms for maintaining control of the level of detail of location information about a subject with the subject himself/herself. That is, automated mechanisms are provided that operate, based on pre-defined subject privacy policies, to downgrade or reduce the precision of location information returned to requestors to a level of detail/granularity that the subject is comfortable releasing to those types of requestors and for the specified or deduced reasons or purposes.

Figure 2:
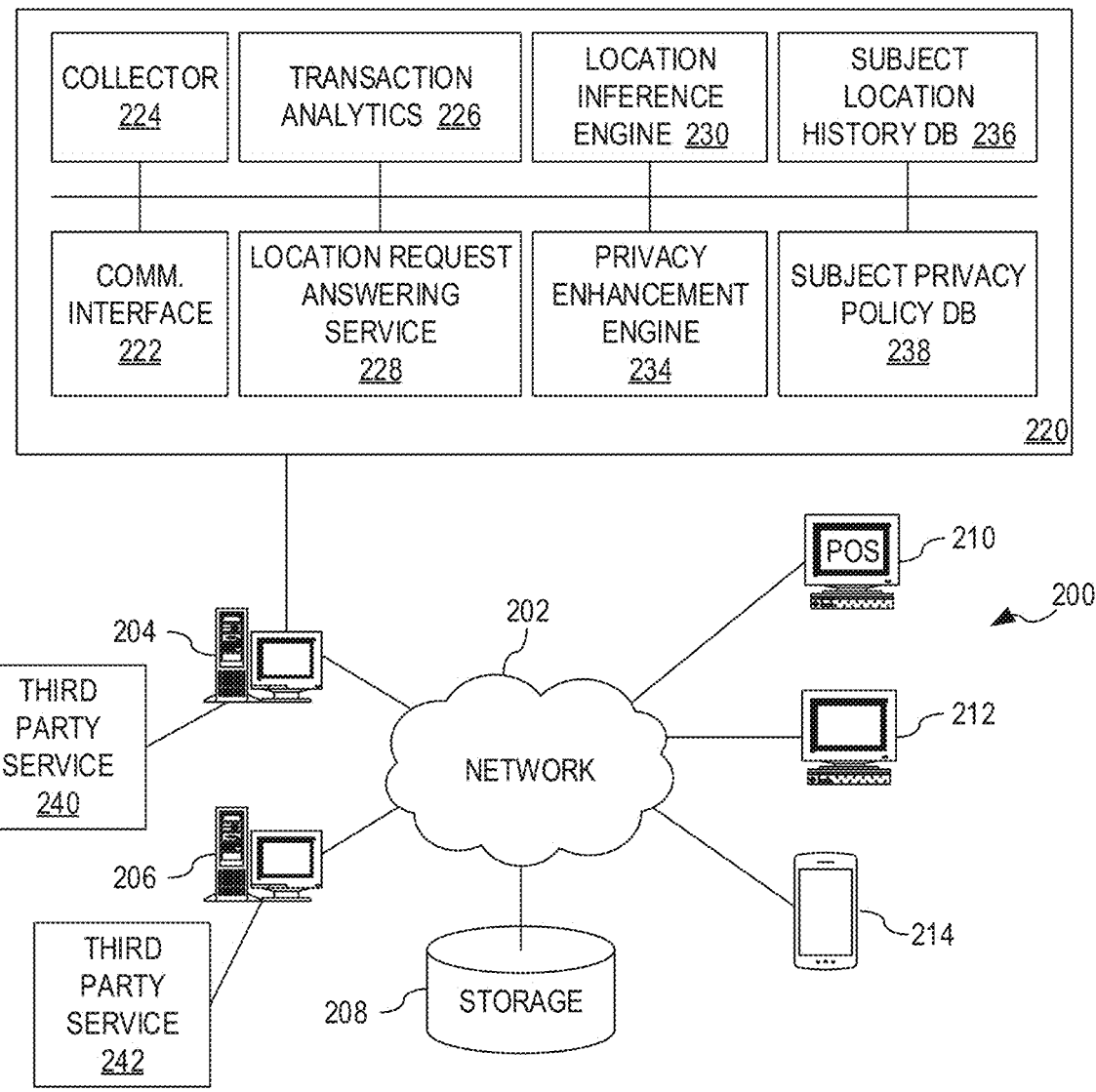
FIG. 2 is an example diagram of a distributed data processing system in which aspects of the illustrative embodiments may be implemented.

FIG. 2 depicts a pictorial representation of an example distributed data processing system in which aspects of the illustrative embodiments may be implemented. Distributed data processing system 200 may include a network of computers in which aspects of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 are connected to network 202 along with storage unit 208. In addition, clients 210, 212, and 214 are also connected to network 202. These clients 210, 212, and 214 may be, for example, personal computers, network computers, portable communication devices comprising computer functionality, e.g., smart phones, point of sale devices (POSs), or the like. In the depicted example, server 204 provides data, such as boot files, operating system images, and applications to the clients 210, 212, and 214. Clients 210, 212, and 214 are clients to server 204 in the depicted example. For example, servers 204, 206 may execute third party computing services 205, 207 that may be accessed by users of client computing devices 210, 212, and 214, to obtain desired functionality, e.g., credit card transaction verification, bank account access, access to information about another user or subject, etc. Distributed data processing system 200 may include additional servers, clients, and other devices not shown.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 200 may also be implemented to include a number of different types of networks, such as for example, an intranet, a local area network (LAN), a wide area network (WAN), or the like. As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

As shown in FIG. 2, one or more of the computing devices, e.g., server 204, may be specifically configured to implement a privacy enhanced location service computing system. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 204, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates providing privacy enhanced location verification for improved transaction security, where transactions may be any exchange of location data about a subject between a requestor computing system and a location service computing system. Such transactions may be part of, or associated with, other transactions, such as exchange of funds, accessing of other information/data, accessing computing resources such as databases, computing devices or systems, or the like.

As shown in FIG. 2, the privacy enhanced location service computing system 220 comprises a communication interface 222 through which data communications are made possible between the privacy enhanced location service computing system 220 and other computing systems/devices, storage systems/devices, and the like, via one or more data networks, such as data network 202. A collector 220 provides the executed algorithms, logical data structures, and the like, to facilitate the collection of transactions corresponding to activities involving users of the client computing devices 210, 212, 214 with one or more services provided by one or more of the server computing devices 204, 206 or other computing systems/devices accessible via the one or more data networks 202. These transactions may be with regard to computing systems that may act as location data sources, such as location data sources 170 in FIG. 1, for purposes of providing location data for use by the privacy enhanced location service computing system 220 in determining the location of subjects. The collector 220 collects the data from these sources of transaction information and location information and provides this information to transaction analytics 226 for analysis to determine whether the incoming transaction information/location information is supportive of a current location associated with the subject remaining the current location of the subject, or if a change in the presumed location of the subject is to be made, i.e. suggests a new location of the subject. The location inference engine 230 implements a spatio-temporal location model and repository system 231, such as described previously with regard to element 130 in FIG. 1, for inferring the subject's presumed location, either on a routine or periodic basis, in response to receiving new transaction or location data from sources via the collector 220, or in response to a location query from a location query source computing system, such as 110 in FIG. 1, which may be any of servers 204, 206 or client computing devices 210, 212, or 214 depending on the particular implementation.

The location request answering service 228 provides the executed algorithms and logical data structures to facilitate processing and responding to location queries received from location query source computing systems based on the location information generated by the location inference engine 230. In some instances, the location inference engine 230 may store and retrieve historical location information for a subject from entries corresponding to a subject that are stored in the subject location history repository or database 236. The entries in the subject location history repository or database 236 may be used, for example, by the spatio-temporal location model 232 to determine a previous location of the subject in the past at a particular point in time, predict a future location of the subject at a future time, or the like. As mentioned previously, the spatio-temporal location model 232 may be implemented as a trained neural network or cognitive computing system, such as a trained instance of the Watson™ cognitive computing system, available from International Business Machines (IBM) Corporation of Armonk, N.Y.

The location information returned by the location request answering service 228 may be a modified location information response in which the location information has been downgraded in precision in accordance with the operations of the privacy enhancement engine 234 based on predefined and/or default subject privacy policies in the subject privacy policy repository or database 238. For example, the privacy enhancement engine 234 provides the executed algorithms and logical data structures to facilitate the processing of location information and providing of modified location information to the location request answering service 228 in a manner such as described previously with regard to one or more embodiments of privacy enhancement engine 140 in FIG. 1. The privacy enhancement engine 234 modifies the location information generated or provided by the location inference engine 230 to an appropriate level of detail/granularity corresponding to that permitted by the subject privacy policies that are applicable to the particular type of requestor, type of transaction, reason or purpose for the location query, or the like. Moreover, as noted previously, the location information may be modified based on negotiation limits established by the subject that provide a basis for providing location information at a level of detail/granularity that falls between a level of detail/granularity requested in the location query and that permitted by the applicable subject privacy policies.

Based on the location information generated by the location inference engine 230, and potentially modified by the privacy enhancement engine 234, the location request answering service 228 generates a location information response to the location query and transmits the location information response via the communication interface 222 and one or more data networks 202 to the location query source computing system that originated the location query, e.g., server 204, 206, or a client computing device 210, 212, or 214.

Figure 3:
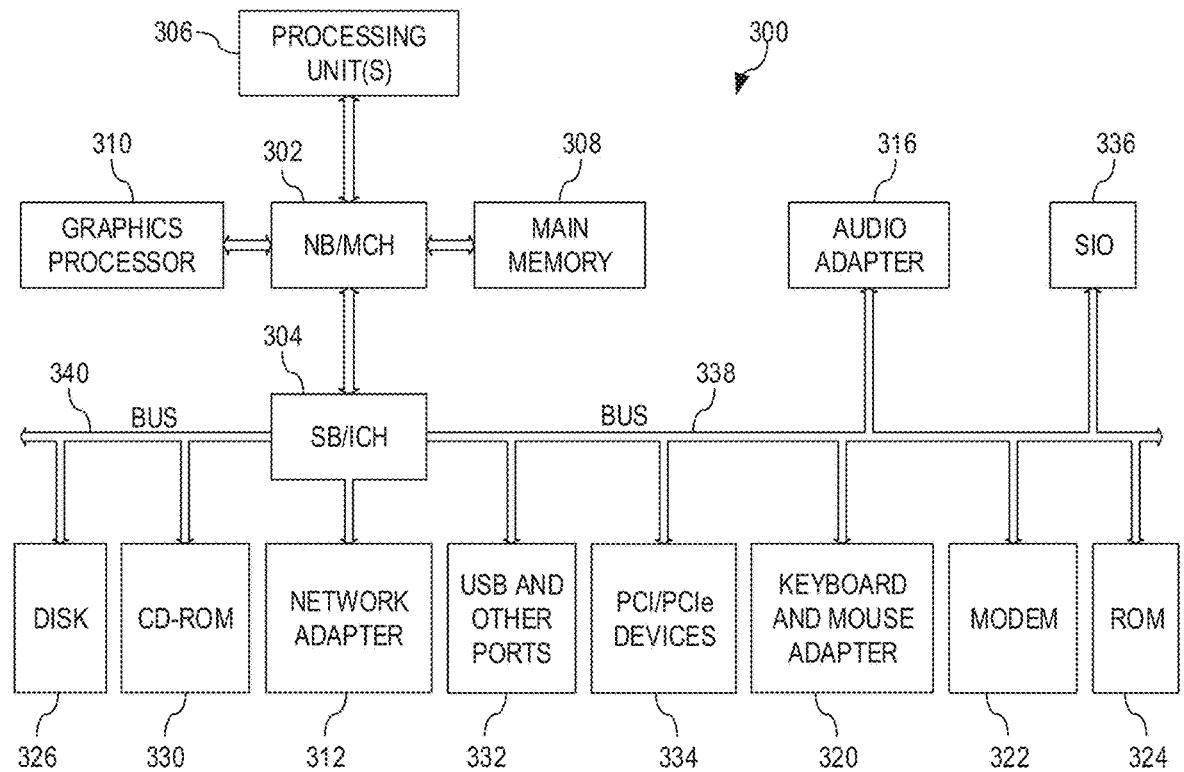
FIG. 3 is an example block diagram of a computing device in which aspects of the illustrative embodiments may be implemented.

FIG. 3 is a block diagram of just one example data processing system in which aspects of the illustrative embodiments may be implemented. Data processing system 300 is an example of a computer, such as server computing device in which one or more of the elements of the transaction verification system 100 in FIG. 1 may be implemented. For example, computer usable code or instructions implementing the processes and aspects of the illustrative embodiments of the present invention may be located and/or executed by the data processing system 300 so as to achieve the operation, output, and external effects of the illustrative embodiments as described herein.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306. The operating system coordinates and provides control of various components within the data processing system 300 in FIG. 3. As a client, the operating system may be a commercially available operating system such as Microsoft Windows 10 or the like. An object-oriented programming system, such as the Java™ programming system, may run in conjunction with the operating system and provides calls to the operating system from Java™ programs or applications executing on data processing system 200. Various virtual machines (VMs) and virtual machine management (VMM) mechanisms may also be provided for implementing elements of the illustrative embodiments.

As a server, data processing system 300 may be, for example, an IBM eServer™ System p computer system, Power™ processor based computer system, or the like, running the Advanced Interactive Executive (AIX) operating system or the LINUX® operating system. Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

As mentioned above, in some illustrative embodiments the mechanisms of the illustrative embodiments may be implemented as application specific hardware, firmware, or the like, application software stored in a storage device, such as HDD 326 and loaded into memory, such as main memory 308, for executed by one or more hardware processors, such as processing unit 306, or the like. As such, the computing device shown in FIG. 3 becomes specifically configured to implement the mechanisms of the illustrative embodiments and specifically configured to perform the operations and generate the outputs described herein with regard to the transaction verification system and methodology.

Those of ordinary skill in the art will appreciate that the hardware in FIGS. 2-3 may vary depending on the implementation. Other internal hardware or peripheral devices, such as flash memory, equivalent non-volatile memory, or optical disk drives and the like, may be used in addition to or in place of the hardware depicted in FIGS. 2-3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device that is configured with flash memory to provide non-volatile memory for storing operating system files and/or user-generated data, for example. Essentially, data processing system 300 may be any known or later developed data processing system without architectural limitation.

Figure 4:
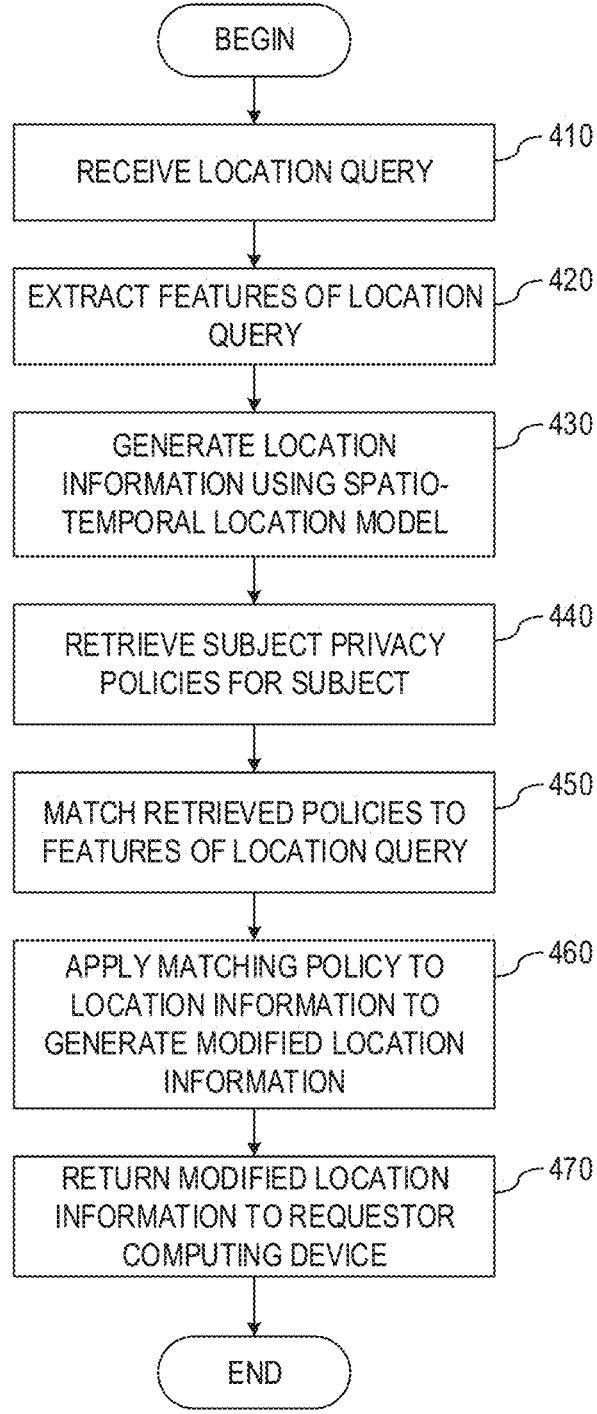
FIG. 4 is an example flowchart outlining an example operation of a privacy enhanced location service computing system in accordance with one illustrative embodiment.

FIG. 4 is an example flowchart outlining an example operation of a privacy enhanced location service computing system in accordance with one illustrative embodiment. As shown in FIG. 4, the operation starts by receiving a location query from a requestor computing system (step 410). Features of the location query and/or corresponding transaction are extracted to identify a subject of the location query, a type of the transaction, characteristics of the transaction indicative of a reason or purpose of the location query, temporal criteria for the location query, e.g., a time point in the past, present, or future, and other pertinent features for identifying a location of the subject at a particular temporal point under particular conditions corresponding to the type of requestor, type of transaction, and the like (step 420).

The privacy enhanced location service applies a spatio-temporal location model to retrieve historical location information and current location information associated with the subject of the location query and infer a location of the subject at the temporal point specified in the location query (step 430). The privacy enhanced location service retrieves a set of one or more predefined subject privacy policies, corresponding to the subject of the location query, from a subject privacy policies repository or database (step 440). In some cases this set of one or more predefined subject privacy policies may comprise a default privacy policy, such as in cases where the subject has not defined personalized privacy policies.

The retrieved one or more predefined subject privacy policies are matched with the features extracted from the location query to identify one or more matching subject privacy policies that match the features to a predetermined level of correspondence, e.g., a predetermined threshold matching measure (step 450). The matching one or more subject privacy policies are applied to the location information generated by the spatio-temporal location model to modify the location information to a level of detail/granularity specified in the corresponding one or more matching subject privacy policies (step 460). In general, the aim is to match a single subject privacy policy, however in the case that multiple policies may be found to sufficiently match, any discrepancies in the level of detail/granularity of the location information that may be returned as indicated in the policies may be resolved in favor of the less precise location information, i.e. providing greater privacy for the subject by returning more coarse grain location information.

The modified location information is returned to the requestor computing system (step 470). The operation then terminates.

In some illustrative embodiments, the privacy enhanced location service computing system, such as 120 in FIG. 1 or 220 in FIG. 2, may be implemented as part of a cloud computing system. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer ca unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
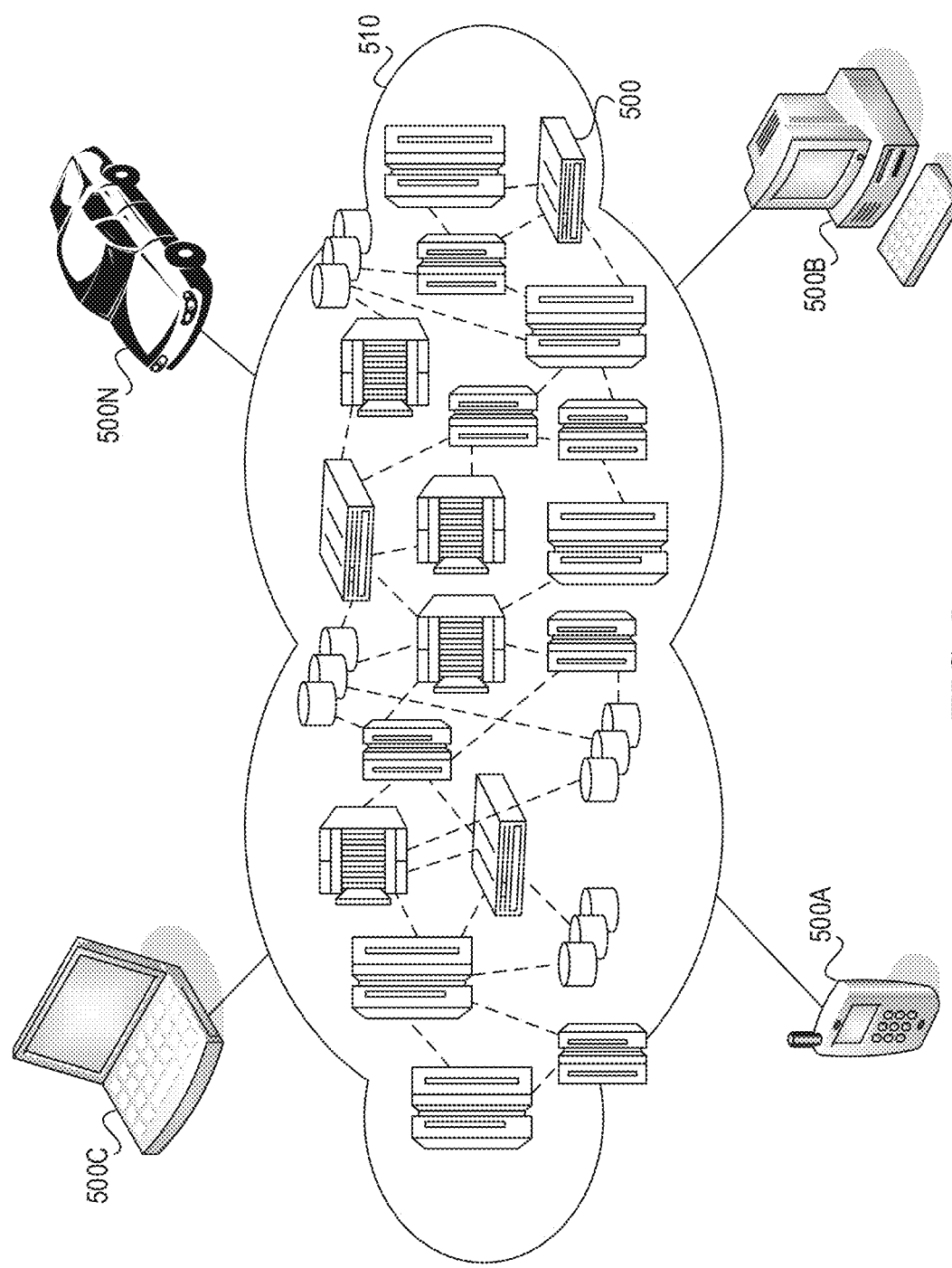
FIG. 5 is an example diagram of a cloud computing environment in which aspects of the illustrative embodiments may be implemented.

Referring now to FIG. 5, illustrative cloud computing environment 510 is depicted. As shown, cloud computing environment 510 includes one or more cloud computing nodes 500 with which local computing devices used by cloud consumers, such as, for example, personal digital assistant (PDA) or cellular telephone 500A, desktop computer 500B, laptop computer 500C, and/or automobile computer system 500N may communicate. Nodes 500 may communicate with one another. They may be grouped (not shown) physically or virtually, in one or more networks, such as Private, Community, Public, or Hybrid clouds as described hereinabove, or a combination thereof.

This allows cloud computing environment 510 to offer infrastructure, platforms and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
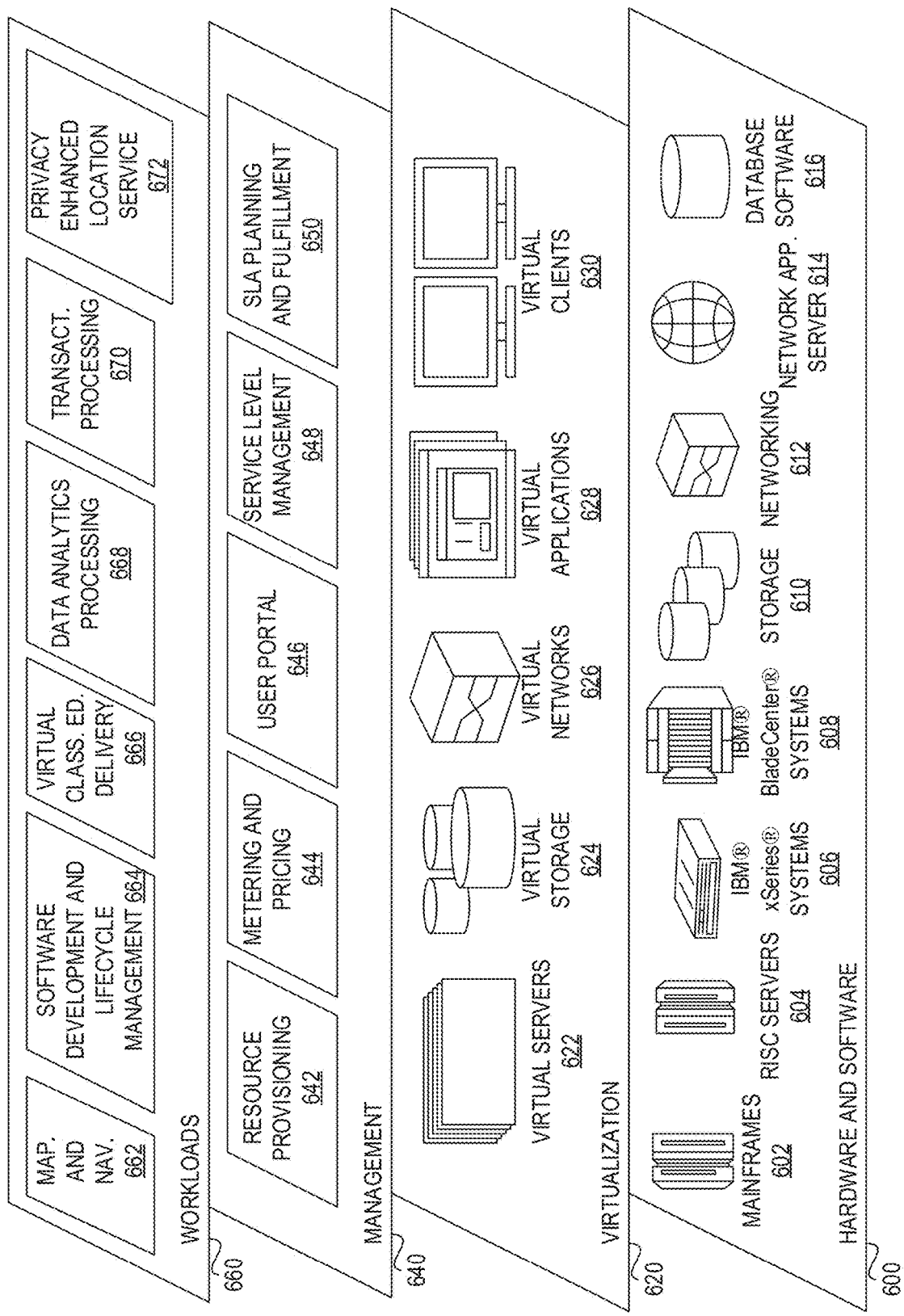
FIG. 6 is an example diagram of a set of functional abstraction layers provided by a cloud computing environment in which aspects of the illustrative embodiments may be implemented.

Referring now to FIG. 6, a set of functional abstraction layers provided by cloud computing environment, e.g., cloud computing environment 510 in FIG. 5, is shown. It should be understood in advance that the components, layers, and functions shown in FIG. 6 are intended to be illustrative only and embodiments of the invention are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 640 may provide the functions described below. Resource provisioning 642 provides dynamic procurement of computing resources and other resources that are utilized to perform tasks within the cloud computing environment. Metering and Pricing 644 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 646 provides access to the cloud computing environment for consumers and system administrators.

Service level management 648 provides cloud computing resource allocation and management such that required service levels are met. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 662; software development and lifecycle management 664; virtual classroom education delivery 666; data analytics processing 668; transaction processing 670; and privacy enhanced location service system 672. The transaction verification system 672 may comprise the various engines, logic, data structures, and the like, in the workloads layer 660 for implementing the mechanisms of the illustrative embodiments. As noted above, these mechanisms may be distributed across multiple physical and/or logical computing devices that together operate to provide the transaction verification system 672.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions executed by the processor to configure the processor to implement a privacy enhanced location service, the method comprising:
   receiving, by the privacy enhanced location service, from a requestor computing device, a location query requesting location information for a subject;
   retrieving, by the privacy enhanced location service, a selected subject privacy policy data structure, selected from a set of subject privacy policy data structures corresponding to the subject identified in the location query;
   applying, by the privacy enhanced location service, the selected subject privacy policy data structure to location information associated with the subject to generate modified location information having a granularity of location information specified in the selected subject privacy policy data structure; and
   transmitting, by the privacy enhanced location service, the modified location information to the requestor computing device, wherein the selected subject privacy policy data structure comprises at least one negotiation limit criterion specifying a limit to increasing a specificity of the location information in response to an automated negotiation operation between the data processing system and the requestor computing device, and wherein applying the selected subject privacy policy data structure comprises executing an automated negotiation operation between the data processing system and the requestor computing device based on the at least one negotiation limit criterion.

2. The method of claim 1, further comprising:
   executing a spatio-temporal computing model in the data processing system to generate the location information associated with the subject, wherein the spatio-temporal computing model generates the location information by inferring a location of the subject from location data from one or more location data source computing devices.

3. The method of claim 1, wherein each subject privacy policy data structure in the set of subject privacy policy data structures comprises one or more subject privacy policy criteria in association with a corresponding granularity of location information that is to be returned to the requestor computing device in response to the one or more subject privacy policy criteria being satisfied by at least one of a characteristic of the requestor computing device or a transaction feature of a transaction associated with the location query.

4. The method of claim 3, wherein the characteristic of the requestor computing device comprises a type of party with which the requestor computing device is associated, and wherein the features of the transaction comprise a type of the transaction.

5. The method of claim 1, wherein applying the selected subject privacy policy data structure to the location information to generate modified location information having a granularity of location information specified in the selected subject privacy policy data structure comprises downgrading a granularity of the location information to provide a less precise location information as the modified location information.

6. The method of claim 1, wherein the at least one negotiation limit criterion comprises a plurality of negotiation limit criteria, and wherein each negotiation limit criterion in the negotiation limit criteria is associated with at least one of a corresponding characteristic of the requestor computing device or a corresponding transaction feature of a transaction associated with the location query, for which the corresponding negotiation limit criterion is applicable.

7. The method of claim 1, further comprising selecting the selected subject privacy policy data structure, from the set of subject privacy policy data structures corresponding to the subject identified in the location query, at least by applying each of the subject privacy policy data structures in the set of subject privacy policy data structures to characteristics of the location query to determine a subject privacy policy data structure that has a highest matching of characteristics of the location query to characteristics of the subject privacy policy data structure, and selecting the subject privacy policy data structure having the highest matching as the selected subject privacy policy data structure.

8. The method of claim 2, further comprising:
   collecting, from a plurality of transaction source computing systems, transaction data providing details regarding transactions conducted by the subject over a period of time; and
   executing transaction analytics on the collected transaction data to identify an inferred past location of the subject, wherein the spatio-temporal location model operates on the inferred past location of the subject to generate the inferred location of the subject.

9. The method of claim 1, wherein the spatio-temporal model comprises a trained neural network that is trained to predict a current location of the subject based on historical location information obtained from a plurality of different source computing devices.

10. A computer program product comprising a non-transitory computer readable storage medium having a computer readable program stored therein, wherein the computer readable program, when executed in a data processing system, causes the data processing system to implement a privacy enhanced location service that operates to:
   receive, from a requestor computing device, a location query requesting location information for a subject;
   retrieve a selected subject privacy policy data structure, selected from a set of subject privacy policy data structures corresponding to the subject identified in the location query;
   apply the selected subject privacy policy data structure to location information associated with the subject to generate modified location information having a granularity of location information specified in the selected subject privacy policy data structure; and
   transmit the modified location information to the requestor computing device, wherein the selected subject privacy policy data structure comprises at least one negotiation limit criterion specifying a limit to increasing a specificity of the location information in response to an automated negotiation operation between the data processing system and the requestor computing device, and wherein applying the selected subject privacy policy data structure comprises executing an automated negotiation operation between the data processing system and the requestor computing device based on the at least one negotiation limit criterion.

11. The computer program product of claim 10, wherein the computer readable program further causes the data processing system to execute a spatio-temporal computing model in the data processing system to generate the location information associated with the subject, wherein the spatio-temporal computing model generates the location information by inferring a location of the subject from location data from one or more location data source computing devices.

12. The computer program product of claim 10, wherein each subject privacy policy data structure in the set of subject privacy policy data structures comprises one or more subject privacy policy criteria in association with a corresponding granularity of location information that is to be returned to the requestor computing device in response to the one or more subject privacy policy criteria being satisfied by at least one of a characteristic of the requestor computing device or a transaction feature of a transaction associated with the location query.

13. The computer program product of claim 12, wherein the characteristic of the requestor computing device comprises a type of party with which the requestor computing device is associated, and wherein the features of the transaction comprise a type of the transaction.

14. The computer program product of claim 10, wherein the computer readable program further causes the privacy enhanced location service to apply the selected subject privacy policy data structure to the location information to generate modified location information having a granularity of location information specified in the selected subject privacy policy data structure at least by downgrading a granularity of the location information to provide a less precise location information as the modified location information.

15. The computer program product of claim 10, wherein the at least one negotiation limit criterion comprises a plurality of negotiation limit criteria, and wherein each negotiation limit criterion in the negotiation limit criteria is associated with at least one of a corresponding characteristic of the requestor computing device or a corresponding transaction feature of a transaction associated with the location query, for which the corresponding negotiation limit criterion is applicable.

16. The computer program product of claim 10, wherein the computer readable program further causes the privacy enhanced location service to select the selected subject privacy policy data structure, from the set of subject privacy policy data structures corresponding to the subject identified in the location query, at least by applying each of the subject privacy policy data structures in the set of subject privacy policy data structures to characteristics of the location query to determine a subject privacy policy data structure that has a highest matching of characteristics of the location query to characteristics of the subject privacy policy data structure, and selecting the subject privacy policy data structure having the highest matching as the selected subject privacy policy data structure.

17. The computer program product of claim 11, wherein the computer readable program further causes the spatio-temporal computing model to:

collect, from a plurality of transaction source computing systems, transaction data providing details regarding transactions conducted by the subject over a period of time; and execute transaction analytics on the collected transaction data to identify an inferred past location of the subject, wherein the spatio-temporal location model operates on the inferred past location of the subject to generate the inferred location of the subject.

18. An apparatus comprising:
at least one processor; and
at least one memory coupled to the at least one processor, wherein the at least one memory comprises instructions which, when executed by the at least one processor, cause the at least one processor to implement a privacy enhanced location service that operates to:
receive, from a requestor computing device, a location query requesting location information for a subject;
retrieve a selected subject privacy policy data structure, selected from a set of subject privacy policy data structures corresponding to the subject identified in the location query;
apply the selected subject privacy policy data structure to location information associated with the subject to generate modified location information having a granularity of location information specified in the selected subject privacy policy data structure; and
transmit the modified location information to the requestor computing device, wherein the selected subject privacy policy data structure comprises at least one negotiation limit criterion specifying a limit to increasing a specificity of the location information in response to an automated negotiation operation between the data processing system and the requestor computing device, and wherein applying the selected subject privacy policy data structure comprises executing an automated negotiation operation between the data processing system and the requestor computing device based on the at least one negotiation limit criterion.

19. The method of claim 1, wherein executing the negotiation operation comprises automatically determining the granularity of the location information at least by modifying a first granularity of location information specified in the selected subject privacy policy data structure to a different second granularity of location information that is the granularity of the location information generated by applying the selected subject privacy policy data structure, where the different second granularity of location information is a more specific granularity than the first granularity of location information but equal to or less than the negotiation limit.

20. The method of claim 19, wherein the selected subject privacy policy data structure comprises a plurality of different negotiation criteria, each negotiation limit criterion in the plurality of different negotiation limit criteria corresponding to at least one different corresponding location query characteristic, and wherein the at least one negotiation limit criterion used to execute the automated negotiation operation is selected from the plurality of different negotiation criteria based on a matching of characteristics of the location query received from the requestor computing device and the at last one different corresponding location query characteristic corresponding to the different negotiation limit criteria.

* * * * *